United States Patent [19]

Kitagawa

[11] 4,020,900
[45] May 3, 1977

[54] DEVICE FOR VENTILATING COOLING AIR OF CONSTRUCTION

[75] Inventor: Kunio Kitagawa, Hirakata, Japan

[73] Assignee: Kabushiki Kaisha Komatsu Seisakusho, Tokyo, Japan

[22] Filed: June 25, 1974

[21] Appl. No.: 482,852

[30] Foreign Application Priority Data

Jan. 31, 1974 Japan .............. 49-12431[U]

[52] U.S. Cl. .................... 165/135; 123/41.49; 180/54 A; 181/33 K; 181/42; 181/46; 181/50

[51] Int. Cl.² ............... F28F 13/00; B60K 11/04; F01P 7/10

[58] Field of Search ......... 123/41.48, 41.49, 41.54, 123/41.58, 41.63, 41.65; 180/68 R, 68 P, 54 A; 165/135; 98/40 D, 40 VM; 181/42, 46, 33 K, 36 C, 50

[56] References Cited

UNITED STATES PATENTS

| | | | |
|---|---|---|---|
| 2,270,825 | 1/1942 | Parkinson et al. | 181/42 |
| 2,500,268 | 3/1950 | Adams | 123/41.49 X |
| 2,519,161 | 8/1950 | Tucker | 181/42 |
| 2,552,847 | 5/1951 | Farr et al. | 181/42 |
| 2,728,411 | 12/1955 | Pasturczak | 123/41.49 X |
| 3,235,001 | 2/1966 | Giannotti | 165/135 X |
| 3,404,732 | 10/1968 | Mork | 123/41.49 X |
| 3,642,092 | 2/1972 | Cederbaum | 181/50 X |
| 3,714,884 | 2/1973 | Christiansen | 98/40 D |
| 3,738,448 | 6/1973 | Ver et al. | 181/42 |
| 3,788,418 | 1/1974 | Clancy et al. | 180/68 R |
| 3,791,482 | 2/1974 | Sykora | 181/33 K X |
| 3,796,277 | 3/1974 | Gordon | 181/33 K X |
| 3,812,927 | 5/1974 | Kawamura | 180/54 A |

Primary Examiner—C. J. Husar
Assistant Examiner—Sheldon Richter
Attorney, Agent, or Firm—Armstrong, Nikaido & Marmelstein

[57] ABSTRACT

A device for ventilating cooling air for cooling the coolant of a water-cooled engine of a construction machine having inlets and outlets for cooling the air for which dissipates the heat of the coolant of the engine at least one of said inlets and outlets are directed elevationally upwardly or downwardly with respect to the machinery, and thus the noise generated from the engine is remarkably reduced.

7 Claims, 3 Drawing Figures

DEVICE FOR VENTILATING COOLING AIR OF CONSTRUCTION

BACKGROUND OF THE INVENTION

This invention relates to a device for ventilating cooling air which cools the coolant of an engine.

Heretofore, in a construction vehicle having a water-cooled engine thereon, a radiator and a fan are mounted at the front of the engine, and the heat of the coolant of the engine passing through the radiator is dissipated by the cooling air drawn from the outside of the vehicle by the fan. The cooling air drawn and exhausted by the fan is taken only from the front or side of the vehicle. Therefore, the noise of the engine and fan is emitted from the front and side of the vehicle through the inlet and outlet toward the outside of the vehicle so as to produce the high noise of a general construction vehicle. In order to reduce such noise, a sealed engine room may be constructed so as not to leak the noise outside of the engine, but it is impossible to seal completely the engine room, because the engine room becomes overheated. Accordingly noise absorbing material has heretofore been mounted onto the blade mounted to the outlet of the cooling air and to the inside of the engine room so as to reduce the noise, but the desired effect cannot be actually obtained.

SUMMARY OF THE INVENTION

It is, therefore, an object of the present invention to provide a device for ventilating cooling air for cooling the coolant of an engine of a construction vehicle which may reduce the noise of the engine at the periphery of the vehicle.

According to one aspect of the device of the present invention, at least one of the inlet and outlet of the cooling air which dissipates the heat of the coolant passing through the radiator is opened to the vertical with respect to the vehicle so as to exhaust the air with the noise generated from the engine through the inlet and outlet vertically.

BRIEF DESCRIPTION OF THE DRAWINGS

This and other objects, features and advantages of the device for ventilating cooling air for cooling the coolant of an engine according to the present invention will become more fully apparent from the following description taken in conjunction with the accompanying drawings, in which.

DESCRIPTION OF THE PREFERRED EMBODIMENT

Figure 1:
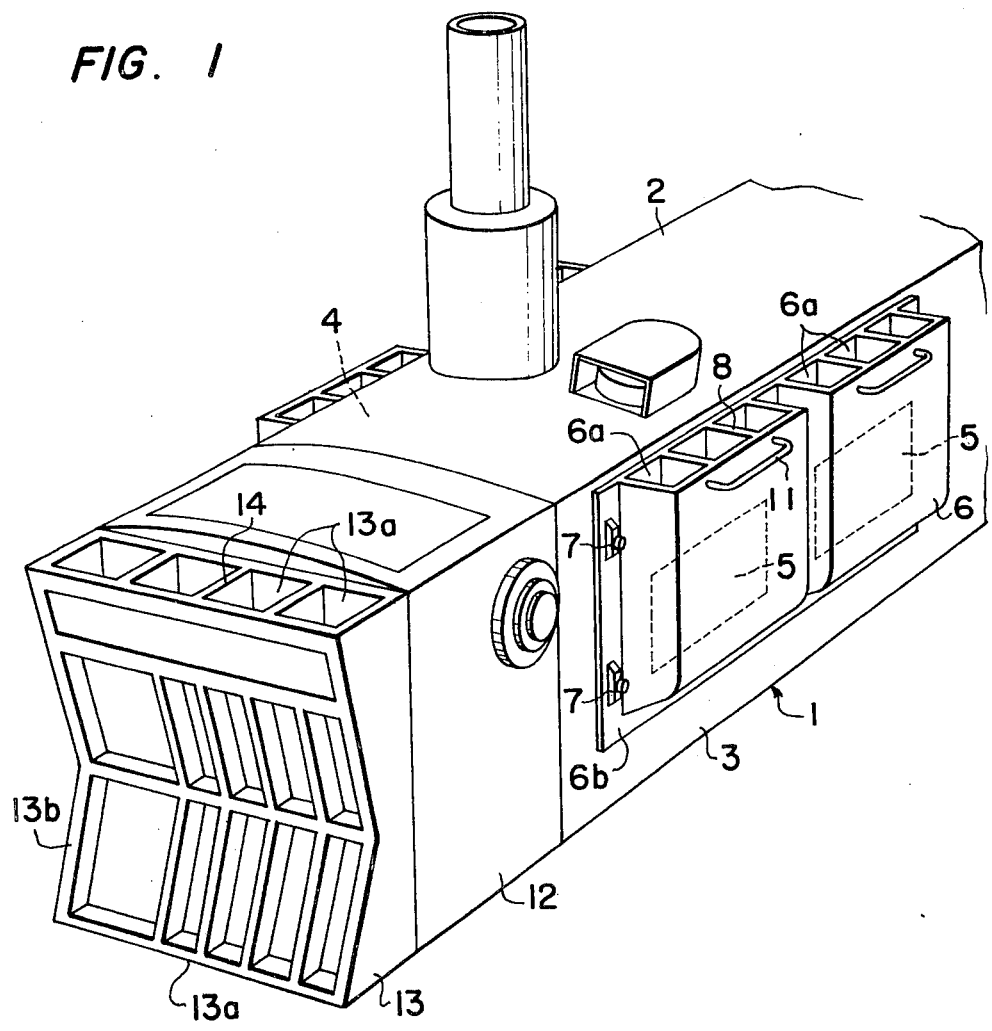
FIG. 1 is a perspective view of the device as one embodiment of the invention.

Referring now to the drawings, numeral 1 is a vehicle body of construction machinery such as, for example, a bulldozer. There is provided an engine room 4 composed of upper plate 2 and both side plates 3 at the front thereof, and a cooling system composed of water-cooled engine, radiator and fan (not shown) is contained in the engine room 4. Plural openings 5 are opened at both side plates 3 of the engine room 4, and a duct 6 is so mounted as to cover the openings 5. The duct 6 is so constructed as to be of a flat rectangular form having inlets and outlets 6a at the upper surface thereof, and mounting edges 6b mounted to the peripheral edge excluding the upper edge, These mounting edges 6b are removably mounted to the both side plates 3 by fittings 7 mounted to both side plates 3. Plural reinforcing ribs 8 are longitudinally provided at intervals in the duct 6, and noise absorbing material 9 is coated on the inside surface of the duct 6 and on both side surfaces of the reinforcing rib 8. Porous plate 10 such as punching metal or expanded metal is provided at the inside surface of the noise absorbing material 9 so as to fix the noise absorbing material 9 thereto. Numeral 11 is a handle used for removing the duct 6 with respect to both side plates 3.

A guard 12 is provided at the front of the vehicle 1, and other duct 13 is mounted to the front surface of the guard 12. The duct 13 is to cover the opening (not shown) opened at the front of the guard and also function as a grill, and inlets and outlets 13a are formed at the upper and lower portions thereof. The front plate 13b of the duct 13 is so formed as to be substantially in L shape, and is also so formed that the center is at an edge and is projected toward the opening. The exhaust air is branched from the opening elevationally up and down, or the air is drawn into the opening uniformly from the upper and lower inlets and outlets 13a. The reinforcing ribs 14 are longitudinally provided at intervals on at the inside of the duct 13, and noise absorbing material and porous plate 10 are mounted on the inside surface of the duct 13 and on both side surfaces of the reinforcing ribs 14.

After the cooling air drawn from one of the ducts 6 or 13 dissipates the heat of the coolant in the engine room 4, it is discharged from the other duct 13 or 6 toward the outside. Since both the ducts 6 and 13 have inlets and outlets at the upper or lower portions, the noise generated directly from the inlets and outlets reaches in the vicinity of free noise field at the upper and lower portions, and accordingly the noise at the periphery of the vehicle 1 is reduced. At the same time, the noise is also absorbed by the noise absorbing material 9 coated on the ducts 6 and 13 and reinforcing ribs 8 and 14 with the result that the noise is greatly reduced in comparison with conventional systems which directly discharge the cooling air from the inlets and outlets.

Figure 3:
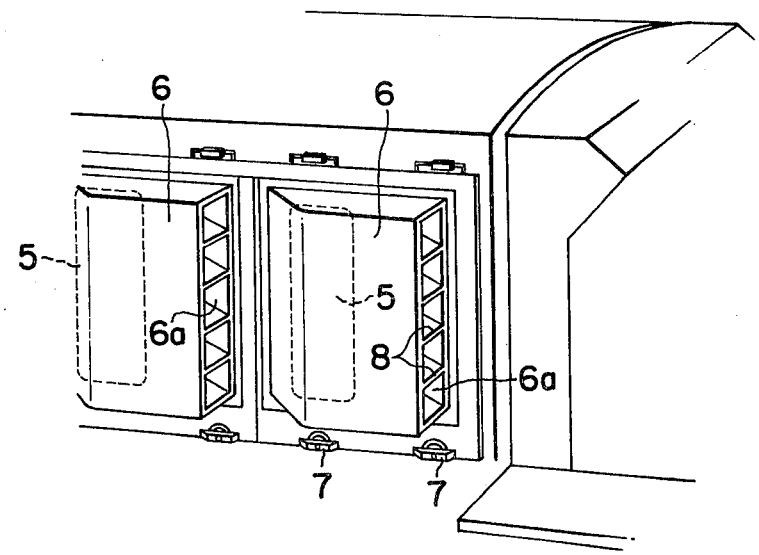
FIG. 3 is a perspective view of another embodiment of the device of the invention.

Referring to FIG. 3, which shows another embodiment of the device of the present invention, the inlets and outlets 6a are provided at the rear of the duct 6. Even if one of the inlets or outlets, particularly inlets are provided at the front or rear thereof it will still reduce sufficiently the noise.

Figure 2:
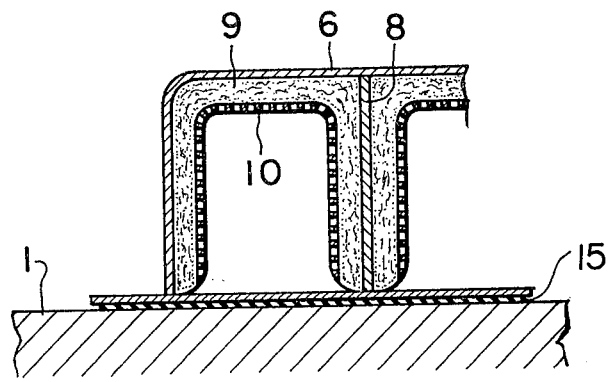
FIG. 2 is a partial sectional view of the duct used in the device of the invention.

Further, as shown in FIG. 2, the duct 6 or 13 is mounted on the guard 12 or the side plate 3 through a buffer member 15 as occasion demands for the purpose of checking propagation of sound propagated through the vehicle body.

It should be understood from the foregoing description that since the device of the present invention is so constructed that at least one of the inlets and outlets of the cooling air which dissipates the heat of the coolant in the engine is vertically positioned, the noise directly discharged from the inlets or outlets is remarkably reduced. It will also be understood that since the noise absorbing material is also coated on the inside surface of the duct forming the inlets and outlets, the noise is further reduced so as to eliminate the noise pollution.

What is claimed is:

1. A device for ventilating cooling air for cooling a coolant of an engine of a construction vehicle having a water cooled engine within a housing and for reducing the noise of the engine emitted through said device, said device comprising at least one inlet and outlet means mounted on the exterior of said housing for directing cooling air, which dissipates the heat of the coolant, vertically with respect to the body of the vehicle, said inlet and outlet means each comprising a plurality of ducts formed by a plurality of parallel reinforcing ribs and noise-absorbing material which covers the inner surface of said ducts whereby the noise of said engine passing through said inlet and outlet means is substantially reduced.

2. A device as set forth in claim 1, wherein at least one of said inlet and outlet means is mounted on the front of said vehicle and the opening in said ducts face both up and down with respect to said vehicle.

3. A device as set forth in claim 1, wherein said inlet and outlet means includes buffer means mounted between said plurality of ducts and said vehicle body.

4. A device as set forth in claim 1, further comprising a guard means provided at the front of the vehicle body, wherein at least one of said inlet means or said outlet means is mounted on said guard means.

5. A device as set forth in claim 4, further comprising a duct means provided at at least one side of an engine room of the vehicle, at least one of said inlet means and said outlet means being mounted over said duct means.

6. A device as set forth in claim 1, further comprising a duct means provided at at least one side of an engine room of the vehicle at least one of said inlet means and said outlet means being mounted over said duct meas.

7. A device as set forth in claim 6, wherein at least one of said inlet means and said outlet means is detachably mounted on a side plate of the engine room.

* * * * *